June 6, 1961 W. S. DRUZ ET AL 2,987,576

SECRECY COMMUNICATION SYSTEM

Filed Feb. 13, 1957 3 Sheets-Sheet 1

Inventors
Walter S. Druz
Erwin M. Roschke
by John J. Pederson
Attorney

SECRECY COMMUNICATION SYSTEM

Inventors
Walter S. Druz
Erwin M. Roschke
by John J. Pederson
Attorney

United States Patent Office 2,987,576

Patented June 6, 1961

2,987,576
SECRECY COMMUNICATION SYSTEM

Walter S. Druz, Bensenville, and Erwin M. Roschke, Des Plaines, Ill., assignors to Zenith Radio Corporation, a corporation of Delaware Filed Feb. 13, 1957, Ser. No. 639,996
11 Claims. (Cl. 179—1.5)

Figure 1:
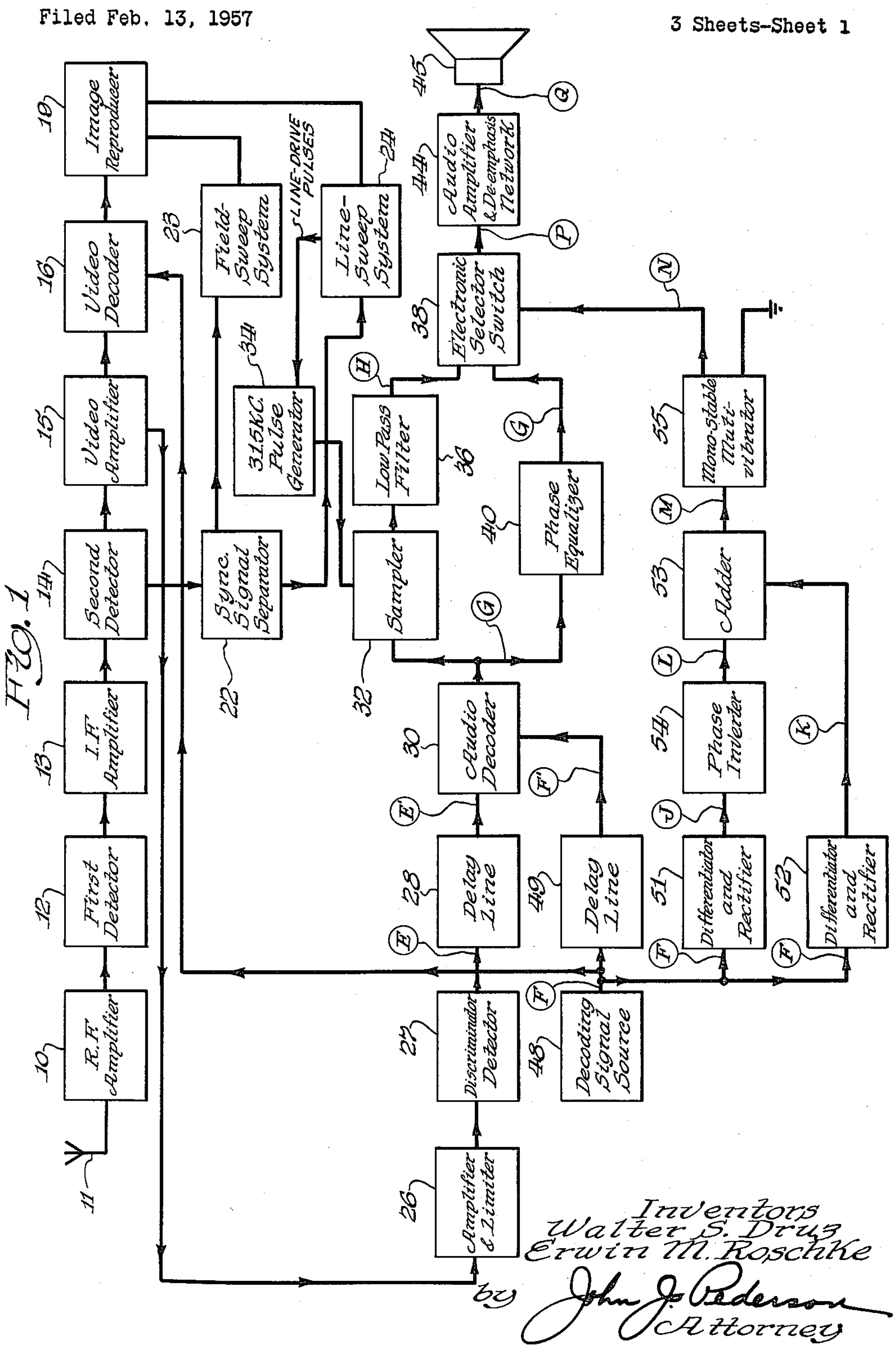

This invention pertains to secrecy communication systems in which an intelligence signal is transmitted in coded form to be utilized only in a receiver equipped with a decoding device controlled in accordance with the coding schedule employed at the transmitter. More particularly, the invention relates to a novel apparatus for use in such a secrecy communication system to prevent transient distortion attributable to transmission band width limitations and to the decoding operation, without introducing undesired noise distortion. The novel arrangement of the present invention is particularly attractive when incorporated into the audio decoding portion of a subscription television receiver and for that reason is described in such an environment.

Numerous secrecy systems have been proposed in which an intelligence signal, for example and audio signal, is coded by altering some characteristic of that signal, such as phase, usually at randomly spaced time intervals determined by a coding schedule which is made known only to authorized subscribers. Such secrecy systems do effect adequate coding or scrambling of the intelligence signal. However, there may result from such a coding process a distortion that may be charged, inter alia, to the limited band width allotted to audio transmission which prevents the translation of the entire range of frequency components representing the extremely sharp amplitude excursions of the coded audio signal produced by the phase inversions in the coding operation; almost an infinite band width would actually be required to duplicate such abrupt changes. Consequently, it is difficult in effecting compensating phase inversions in the decoding process at the receiver to avoid transient distortion pulses. Moreover, the compensating phase changes in the decoding apparatus at the receiver do not always occur in exact time coincidence with the corresponding phase changes at the transmitter. Additional undesirable transient pulses are consequently generated and reflected as transient distortion in the decoded audio signal.

Such transient distortion, of course, detracts from the fidelity or quality of reproduction of the decoded intelligence signal, and since the distortion occurs essentially at the instants of phase inversion in the decoding process, it may be effectively removed by interposing a sampling circuit and a low-pass filter in the audio channel in accordance with the teachings of copending application Serial No. 397,176, filed December 9, 1953, and issued March 22, 1960 as Patent 2,929,865, in the name of Howard K. Van Jepmond, and assigned to the present assignee. The operation of the sampler may be so phased with respect to the code schedule that the decoded audio signal is only sampled (by the use of a super-audible, periodically recurring sampling signal) at times other than the instants of phase inversion. In this way, the decoded or unscrambled signal is sampled or examined only during those intervals when no distortion transients are present. The sampled signal is then shaped in the low-pass filter, producing a distortion-free simulation of the original uncoded signal.

Even though the sampling arrangement of the copending Van Jepmond application does eliminate the distortion attributable to the band width limitations, it is nevertheless essential to provide in the receiver audio translating stages that reproduce a relatively wide range of frequencies in order that the phase inversions of the received coded audio signal are as sharp and as steep as possible. Otherwise, if the phase inversions are "stretched out" or prolonged for a time duration greater than the time separation of the sampling intervals, the distortion will obviously not be removed.

Thus, it is necessary in the system described in the Van Jepmond application to employ relatively wide band receiver audio stages which respond to frequencies not only in the audible range but substantially beyond that range. As an incident to such wide band reception, it is possible that unwanted super-audible or supersonic high-frequency transmission noise components may also be accepted, particularly in a weak-signal area. Moreover, when the sound translating stages are incorporated in a television receiver of the intercarrier type, low-frequency video or picture signal components may be present in the intercarrier sound signal and will likewise be translated through the wide band audio stages. These transmission noise and video components (both of which may be called extraneous noise components here inasmuch as they are not part of the audio signal), being outside of the audible range, would not ordinarily introduce any audible distortion, but since the sampling function in the receiver is actually a modulation function, the undesired extraneous noise components are beat, demodulated or heterodyned down by the sampling signal into the audible range. Consequently, the objectionable noise components may be heard in the decoded audio signal.

Copending application Serial No. 600,196, filed July 26, 1956, and issued June 9, 1959, as Patent 2,890,269, in the name of Walter S. Druz, and assigned to the present assignee, relates to another arrangement for eliminating from the decoded audio signal the transient distortion resulting from the decoding process and because of the transmission band width limitations. Moreover, this is achieved without requiring a relatively high-frequency sampling signal, as in the Van Jepmond application, and thus there is no heterodyning or demodulation of the extraneous noise components into the audible range. Briefly, the decoding signal, employed for decoding and which represents the code schedule according to which the received telecast is coded, is utilized to produce a series of gating pulses each of which corresponds to and anticipates an assigned mode-changing interval, namely, an assigned phase inversion of the decoded audio. These pulses are then used to operate a gate interposed in the audio channel to effectively delete those portions of the decoded audio occurring during the mode-changing intervals. Consequently, the undesired transient distortion is removed. The discontinuities resulting from deleting such portions of the decoded audio signal are effectively "smooed out" to produce a final signal which is relatively free of audible distortion.

While both the Van Jepmond and Druz systems are quite effective in producing a high quality decoded audio signal, the present invention provides an arrangement that is an improvement over both of these prior systems in that it develops a decoded audio signal that is not only free of transient distortion and undesired extraneous noise signal components, but is also substantially devoid of any discontinuities as a result of the distortion-removing operation.

It is, accordingly, an object of the present invention to provide an improved secrecy communication system of the type disclosed in the above-identified Van Jepmond and Druz applications.

It is another object of the invention to provide an improved secrecy communication receiver wherein there is produced a decoded intelligence signal substantially free of transient distortion, extraneous noise components, and discontinuities.

It is still another object of the invention to provide an audio decoding arrangement for a subscription television system for producing a distortion-free and noise-free unscrambled audio signal.

A secrecy communication receiver, constructed in accordance with the present invention, comprises a source of coded intelligence signal and decoding apparatus coupled to the source for varying from time to time a characteristic of the coded intelligence signal between a plurality of different modes in accordance with a predetermined code schedule to develop a decoded intelligence signal with the transitions during the spaced mode-changing intervals subject to introducing undesired distortion in the decoded intelligence signal. Sampling means are coupled to the decoding apparatus for effecting sampling of the decoded intelligence signal only at spaced time intervals different from the mode-changing intervals to develop an output signal that is a substantial simulation of the decoded intelligence signal except that the undesired distortion is removed. Finally, the secrecy communication receiver comprises selecting means coupled to the decoding apparatus and also to the sampling means for selecting the output signal from the sampling means during the spaced mode-changing intervals and the decoded intelligence signal from the decoding apparatus during the intervening intervals.

Figure 2:
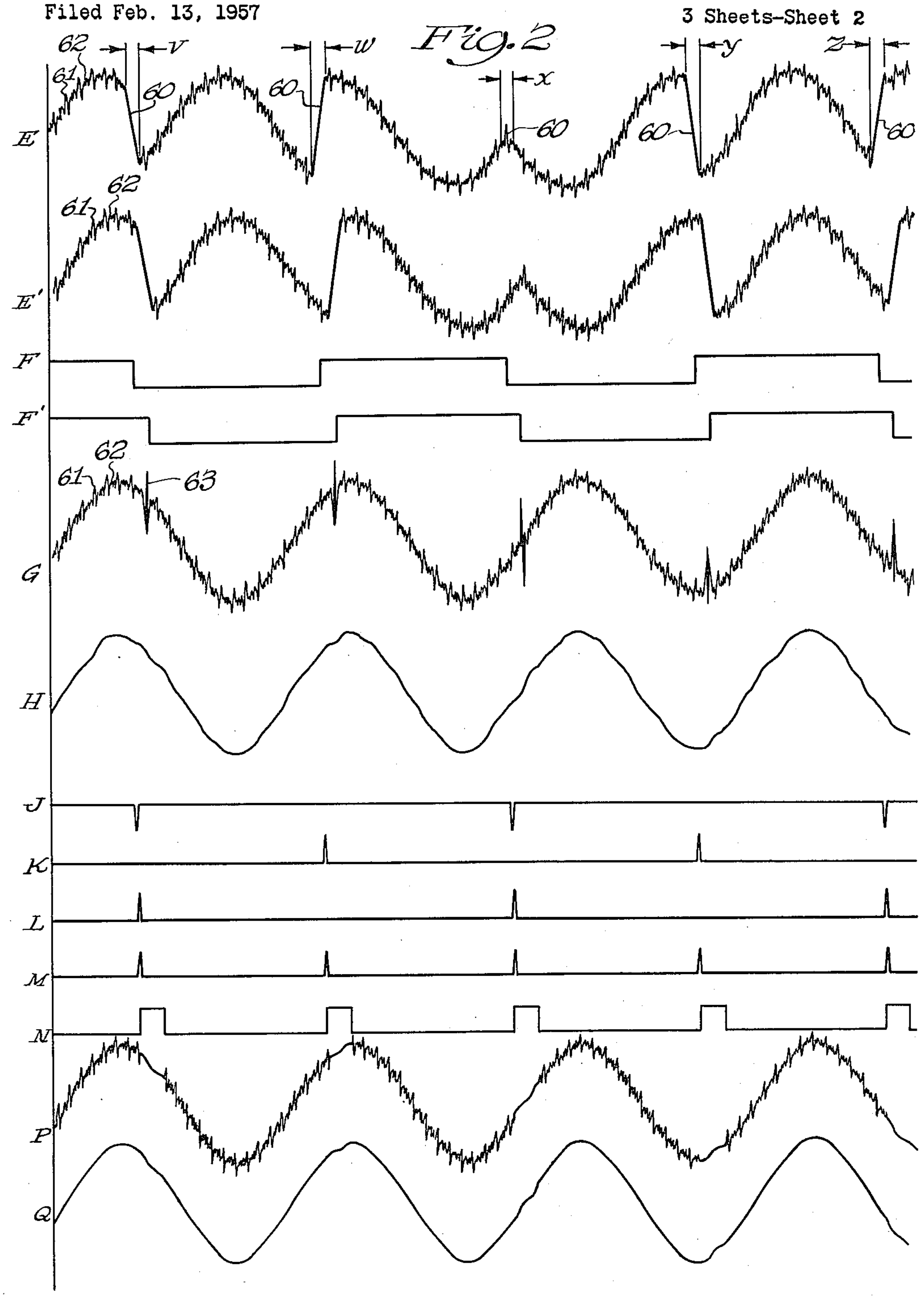
Figure 3:
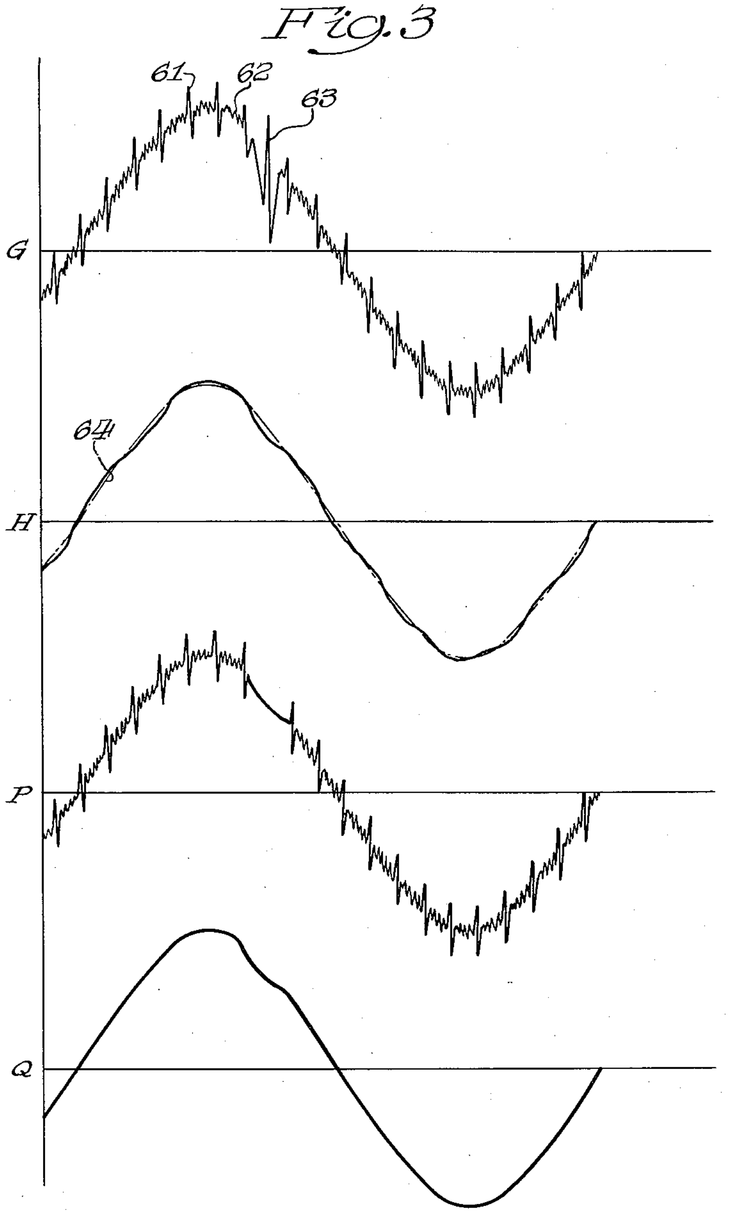

The features of this invention which are believed to be new are set forth with particularity in the appended claims. The invention, together with further objects and advantages thereof, may best be understood, however, by reference to the following description in conjunction with the accompanying drawings, in which:

FIGURE 1 is a schematic representation of a secrecy communication receiver, specifically a subscription television receiver, constructed in accordance with the invention;

FIGURE 2 comprises a family of signal waveforms which appear at various points in the receiver of FIGURE 1 and are helpful in explaining the operation of that receiver; and FIGURE 3 illustrates portions of some of the waveforms of FIGURE 2 redrawn on an expanded time scale.

The receiver illustrated in FIGURE 1 is constructed to utilize a telecase originating at a transmitter of the type described in copending application Serial No. 366,727, filed July 8, 1953, and issued September 16, 1958, as Patent 2,852,598, in the name of Erwin M. Roschke, and assigned to the present assignee. Briefly, in that application a counting devices responds to line-sychronizing pulses to develop a square-wave coding signal having amplitude changes occurring during the line-retrace interval following each succession of 15 line-trace intervals. During the field-retrace intervals, coding pulses are developed and supplied to various input circuits of a bi-stable multivibrator to effect actuation thereof, preferably in random fashion. The counting device is rephased during each field-retrace interval under the control of the bi-stable multivibrator and thus the square-wave coding signal from the counter is effectively phase-modulated in a random manner. The phase-modulated coding signal is employed to effect mode changes in the transmitter by alternately introducing and then removing a time delay of the video with respect to the synchronizing components. The code signal pulses may be transmitted along with the video signal during the field-retrace intervals to facilitate the proper phasing of a similar square-wave signal at the receiver.

The coding signal is also used in the Roschke system to code the audio intelligence. This is accomplished by applying it to the deflection electrodes of a beam-deflection tube having a control grid, which is modulated in accordance with the uncoded audio intelligence, and a pair of collector anodes connected to opposite terminals of the primary winding of an output transformer. With this arrangement, the phase of the audio signal is effectively inverted at the secondary winding of the transformer each time the beam switches from one anode to the other, and this occurs each time there is an amplitude variation of the square-wave coding signal.

The audio phase inversion process of the Roschke system is subject to the introduction of transient distortion since the mode changes may not occur in exact synchronism at the transmitter and receiver, and the limited band width transmission precludes the reproduction of extremely sharp phase inversions. Consequently, the receiver of FIGURE 1 is generally similar to that shown in the Roschke application but is further adapted to prevent the introduction of any noise or transient components in the decoded audio signal.

More specifically, the receiver comprises a radio-frequency amplifier 10 having input terminals connected to an antenna circuit 11 and output terminals connected to a first detector 12. This detector is coupled through an intermediate-frequency amplifier 13 to a second detector 14 which, in turn, is connected to the input circuit of a video amplifier 15. The output circuit of the video amplifier is connected through a video decoder 16 to the input electrodes of a cathode-ray image-reproducing device 19.

Decoder 16 may be similar to that disclosed and claimed in Patent 2,758,153, issued August 7, 1956, in the name of Robert Adler and assigned to the present assignee. It may comprise a beam-deflection tube having a pair of output circuits which may be selectively coupled into the video channel as the electron beam of the tube is deflected from one to the other of two collector anodes in synchronism with mode changes in the transmitter. As mentioned hereinbefore, these mode changes take the form of variations in the timing of the video components relative to the synchronizing components of the received composite television signal. Consequently, the output circuit coupled to one anode segment includes a time delay network while the output connected to the other anode segment does not, and the timing variations are compensated, effectively to decode the television signal, as the beam of the deflection tube is switched between its anodes. This switching effect is accomplished by means of a deflection control or actuating signal applied to video decoder 16, as explained hereinafter.

Second detector 14 is also coupled to a synchronizing-signal separator 22 which is coupled, in turn, to a field-sweep system 23 and to a line-sweep system 24. The output terminals of sweep systems 23 and 24 are connected respectively to field- and line-deflection elements (not shown) associated with image reproducer 19.

Video amplifier 15 is also connected to an amplifier and amplitude limiter 26 which, in turn, is coupled to a discriminator detector 27 constructed to accept a relatively wide band of frequency components, both audible and superaudible, in order to reproduce the sharp phase inversions of the coded audio signal. As mentioned before, such abrupt changes are represented by relatively high-frequency components lying above the audible range. The output terminals of detector 27 are connected through a delay line 28 to one pair of input terminals of a decoding device in the form of an audio decoder 30. This decoder, as explained briefly hereinbefore and in detail in the aforementioned Roschke application, may comprise a beam-deflection device which is actuated in accordance with the coding schedule of the telecast to effect compensating phase inversions of the coded audio signal to effectively decode that signal.

Alternatively, audio decoder 30 may comprise a phase splitter and an electronic selector switch as shown in copending application Serial No. 513,757, filed June 7, 1955, and issued February 3, 1959, as Patent 2,872,507, in the name of Walter S. Druz, and assigned to the present assignee. In that application, the phase splitter supplies the coded audio signal to the electronic selector switch in push-pull relationship, namely, with two different phases 180° apart. The switch is actuated in accordance with the coding schedule to select certain portions of each of the two signals from the phase splitter.

Copending application Serial No. 440,224, filed June 29, 1954, and issued April 14, 1959, as Patent 2,882,398, in the name of Robert Adler, and assigned to the present assignee, also discloses an arrangement for achieving audio phase inversion.

The decoded audio signal developed in decoding device 30 contains transient distortion during the mode-changing intervals and this is removed by connecting the output of decoder 30 to one pair of input terminals of a sampling device 32 which may be of any well known construction. For example, sampler 32 may take either form of the sampling circuits shown in detail in the aforementioned Van Jepmond application. Line-drive pulses are derived from line-sweep system 24 and are applied to a pulse generator 34 which, in turn, is connected to another input circuit of sampling device 32 to supply a 31.5-kilocycle pulse signal thereto, in order to effect sampling of the decoded audio signal developed in the output of decoder 30. The output circuit of sampler 32 is coupled through frequency-selective or wave-shaping means, such as a suitable low-pass filter 36, to one pair of input terminals of a selecting apparatus in the form of an electronic selector switch 38 having two translating conditions, another pair of input terminals of which is also connected to the output of audio decoder 30 through a phase equalizer 40. By the very nature of a sampling operation a phase variation is introduced between the output signal developed in filter 36 and the decoded audio signal developed in decoding device 30, and thus phase equalizer 40 is constructed to match that phase change. The output terminals of selecting apparatus 38 are connected through a unit 44 which comprises an audio amplifier and a conventional de-emphasis network, as is required in any frequency modulation type receiver, to the input terminals of a speaker 45.

In order to produce a deflection-control signal for video decoder 16 and audio decoder 30, a control mechanism or decoding signal source 48 is connected directly to video decoder 16 and through a delay line 49 to audio decoding device 30. Decoding signal source 48 provides to decoders 16 and 30 a square-wave decoding signal, exhibiting amplitude variations during selected line-retrace intervals representing the code schedule of the telecast, which is identical to that supplied to the corresponding circuits at the transmitter of the aforementioned Roschke application, Serial No. 366,727. Of course, the manner in which the coding signal at the transmitter and the corresponding decoding signal at the receiver are developed is entirely immaterial to the present invention. For that reason, source 48 has been shown merely as one block in the drawing for the sake of simplicity. For example, in accordance with the Roschke application, the square-wave decoding signal developed in control mechanism 48 may be synchronized and phased with relation to the counterpart coding square wave at the transmitter by means of signal bursts transmitted along with the television signal during vertical-retrace intervals. The phase-modulated square wave from source 48 effects operation of audio decoder 30 during line-retrace intervals in order to realize compensating phase inversions of the coded audio during such intervals.

A selecting signal is developed for controlling the condition of selector 38 by providing two differentiator-rectifier units 51, 52 connected to the output of decoding signal source 48. Unit 51 is connected through a phase inverter 54 to one pair of input terminals of an adder 53, and differentiator-rectifier 52 is connected directly to another pair of input terminals of the adder. The output of adder 53 is connected to the input circuit of a monostable multivibrator 55 which is connected in turn to electronic selector switch 38.

In the operation of the described receiver of FIGURE 1, the coded television signal is intercepted by antenna 11, amplified in radio-frequency amplifier 10 and heterodyned to the selected intermediate frequency of the receiver in first detector 12. The resulting intermediate-frequency signal is amplified in intermediate-frequency amplifier 13 and detected in second detector 14 to produce a composite video signal. This latter signal is amplified in video amplifier 15, translated through video decoder 16 and impressed on the input electrodes of image reproducer 19 to control the image intensity in well known manner. Video decoder 16 receives a decoding signal from decoding signal source 48 which has amplitude variations occurring in exact time coincidence with amplitude variations of the coding signal applied as a deflection control signal to a corresponding video coder in the transmitter of the aforementioned Roschke application, Serial No. 366,727, so that the video components applied to the input electrodes of image reproducer 19 are suitably compensated or decoded to effect intelligible image reproduction.

The synchronizing components of the received signal are separated in separator 22, the field-synchronizing components being utilized to synchronize sweep system 23 and, therefore, the field scansion of the image reproducer, while the line-synchronizing pulses are utilized to synchronize sweep system 24 and, therefore, the line scansion of device 19.

Consideration will now be given to the particular manner in which transient distortion that may otherwise result from the transmission band width limitations and the audio decoding process is eliminated in accordance with the invention, with reference to the idealized signal wave-forms of FIGURE 2, portions of which also appear on an expanded time scale in FIGURE 3, which appear at certain points within the audio section of the receiver, which points are indicated by encircled reference letters corresponding to the designations of the curves of FIGURES 2 and 3.

An intercarrier sound signal derived from video amplifier 15 is amplified and amplitude limited in unit 26 and detected is discriminator detector 27 to develop the coded audio signal of curve E. This signal is illustrated for convenience as primarily a sinusoidal signal wave having a frequency of approximately 800 cycles per second and characterized by various phase inversions 60 occurring in a pattern established by the audio coder at the transmitter. Since mode changes are made in the transmitter of the Roschke application after every 15 line-trace intervals, phase inversions 60, which take place during the spaced mode-changing intervals designated V-Z, occur at a frequency of approximately 1000 cycles per second under the present United States standards. While the third phase inversion 60 from the left in curve E (namely, during mode-changing interval X) just happens to occur at a zero cross-over point of the sinusoidal signal and therefore is an exception, the phase inversions generally do not occur instantaneously but require a finite time interval and therefore result in finite-slope transients as shown by the slanting rather than vertical configuration of the wave forms during mode-changing intervals V, W, Y and Z. As mentioned hereinbefore, even if the phase inversions occur instantaneously at the transmitter, it would require the transmission of an infinitely wide band width to transmit all the frequency components which represent such instantaneously abrupt phase inversions.

As also mentioned previously, while detector 27 cannot accept an infinitely wide band of frequencies, it is designed to accept a relatively wide band of frequencies as compared to the conventional discriminator detector found in the usual television receiver in order that the phase intervals 60 may be made as steep as possible. For example, the discriminator detector included in a conventional television receiver normally passes frequencies up to 15 kilocycles but detector 27 is preferably adjusted to translate signal components up to 40 kilocycles. There is a limit, however, as to the high-frequency cut-off point which may be employed since if signal components having frequencies above approximately 40 kilocycles are accepted in an intercarrier type television signal as is presented here there is a possibility that there will be a considerable amount of interference between the sound and video signals.

Due to the fact that detector 27 passes a relatively broad band of frequencies, certain extraneous transmission noise and low-frequency video components appear in the signal of curve E appearing at the output of detector 27. The pulses like that designated 61 represent such video components, which exhibit frequencies around 15,750 cycles per second and 31.5 kilocycles, and the signal components like that labeled 62 appearing between adjacent pulses 61 represent the transmission noise which may have frequencies anywhere up to 40 kilocycles. As stated before, since the video components 61 and the transmission noise components 62 are extraneous to the desired audio information, the two types may collectively be considered as noise.

The coded audio signal of curve E is delayed in delay line 28 to form the signal of curve E′ for application to audio decoder 30. The characteristics of delay line 28 are adjusted so that it introduces a time delay greater than the time duration of a phase inversion 60, for reasons which will become apparent later.

In order to effect compensating phase inversions and accomplish decoding of the coded audio signal of curve E′, decoding signal source or control mechanism 48 develops the decoding signal of curve F having amplitude variations occurring in time coincidence with the mode changes introduced at the transmitter and, consequently, in synchronism with the phase reversals of the received coded audio signal of curve E. Curve F is translated through delay line 49 to develop the signal of curve F′ for application to decoding device 30. Delay line 49 introduces exactly the same delay to the signal of curve F as that introduced to curve E by delay line 28, in order to compensate for the delay of network 28.

Decoding signal F′ effects a phase reversal of the coded audio signal of curve E′ in decoder 30 in response to each amplitude variation of curve F′ to produce at the output terminals of the decoder a decoded audio signal having the wave shape shown in curve G. Since the coded audio of curve E′ contains desired audio components in the audible range of the frequency spectrum but is subject to distortion as represented by the undesired relatively high-frequency extraneous noise components 61, 62 lying outside the audible range, those same undesired high-frequency noise components also appear in the decoded signal of curve G. From an examination of the signal of curve G it will also be seen that there is a "spike" or "pie cut" in the sinusoidal signal at each mode-changing interval, with the exception of interval X, due to the prolonged rather than instantaneous phase changes in the coded audio signal of curve E. Additionally, undesirable switching transients, like that designated 63 in curve G, may be introduced during the decoding process. For example, if decoder 30 takes the form of a beam-deflection tube, such distortion may result from the transfer characteristic of the tube and may also be attributed to the load circuit of the tube, especially if it includes an output transformer. For convenience, transient pulses 63 along with components 61 and 62 are drawn on a reduced scale in the illustrated diagram; it will be appreciated that all these pulses may be many times greater in amplitude than the audio intelligence signal.

It is apparent that the distortion of the sinusoidal signal of curve G, if not eliminated, would detract from the listening quality rather considerably. The distortion is deleted by applying the decoded audio signal of curve G to sampling device 32. Meanwhile, pulse generator 34 is phased by line-drive pulses from sweep system 24 to develop sampling pulses for application to sampler 32 collectively occurring at a 31.5-kilocycle rate and individually occurring during spaced time intervals different from the mode-changing intervals to produce an intermediate signal at the output of sampler 32 consisting of the sampled portions of the decoded audio of curve G, in the manner taught in the Van Jepmond application. Low-pass filter 36 receives this intermediate signal and shapes the wave form to develop the output signal of curve H for application to one input of selector 38. It will be noted that the waveform of curve H is a substantial simulation of the decoded audio of curve G except that the undesired transient distortion is removed.

Attention is directed to FIGURE 3 wherein slightly more than the first complete cycle of curves G and H are shown on an expanded time scale to more clearly illustrate the wave configurations. Of course, the output signal of curve H is not a true sinusoidal signal, as indicated by the dashed construction sinusoidal wave 64 in FIGURE 3, because of the demodulation or heterodyning effect of sampler 32. The variations in curve H around dashed curve 64 represents noise components 61, 62 which have now been beat or demodulated down into the audible range. Consequently, if the signal of curve H is continuously supplied to audio amplifier and de-emphasis network 44, as is the case in the Van Jepmond system, the noise components transformed or converted into the audible frequency range may manifest themselves as slight but definitely perceptible distortion.

In accordance with the invention, the output signal of curve H, rather than being continuously utilized for sound reproduction, is actually applied to unit 44 only during phase-inversion intervals, and there is a very substantial reduction of noise distortion in the final audio signal. To this end, the decoded audio signal of curve G which, while containing the transient distortion of pulses 63 and the super-audible noise components represented by 61 and 62, does not contain any of the noise components which have been demodulated into the audible range as is the case of curve H, is applied to another input of selector 38 through phase equalizer 40. As mentioned previously, since sampler 32 and low-pass filter 36 effectively introduce a phase variation of the signal of curve H with respect to that of curve G, phase equalizer 40 is designed to match that phase change so that the two signals applied to selecting apparatus 38 are in substantially the same phase. This phase variation has not been shown in either the curves of FIGURES 2 or 3 since it would not be perceptible with either one of the two time scales employed.

Selector switch 38 is alternately actuated to select the output signal of curve H from low-pass filter 36 only during the mode-changing intervals V-Z and the decoded audio signal of curve G from phase equalizer 40 during the intervening intervals. This is accomplished by applying the square-wave decoding signal of curve F to differentiator-rectifier units 51 and 52. These units differentiate both the positive and negative amplitude excursions of the signal of curve F, but unit 51 only passes the negative differentiated pulses of curve J and unit 52 only passes the positive differentiated pulses to form the signal of curve K. The pulses of curve J are inverted in phase inverter 54 to form the positive pulses of curve L, and the signals of both curves L and K are added in adder 53 to develop the signal of curve M. Thus, a rather sharply defined pulse is produced for each mode change of the coded audio of curve E. The pulses of curve M are then applied to mono-stable multivibrator 55 to produce the elongated pulses of curve N. The parameters of the multivibrator are so adjusted that once it is triggered from its normal to its abnormal condition, it remains there for a time interval slightly exceeding the duration of each phase inversion of curve E, at which time it returns to its reference condition.

With this arrangement, the pulses of curve N, each of which corresponds to and embraces an assigned mode-changing interval, may collectively serve as a selecting signal to switch selector 38 between its two translating conditions in order to select the signal of curve H during the mode-changing intervals as essentially represented by the pulse components of curve N (although the pulses of waveform N slightly overlap the mode-changing intervals for obvious reasons), and to select the decoded audio of curve G during the intervals intervening the mode-changing intervals, namely, during the intervals intervening the pulses of curve N.

Selector 38 thus produces the final signal of curve P, a portion of which is also shown in FIGURE 3, which is devoid of the undesired transient distortion during the mode-changing intervals, although it does contain the noise components which have been demodulated down into the audio range, and which contains during the intervening intervals the unaltered noise components still lying above the audible range. The audio amplifier and de-emphasis network in unit 44 receive the signal of curve P and effectively removes substantially all of the noise components lying above the audible range and thus shapes the waveform of the final signal to produce the waveshape of curve Q which more closely conforms to the original uncoded intelligence signal. From a study of the waveform of curve Q, which is also shown in FIGURE 3, it may be observed that it is of true sinusoidal shape except for the slight variations during the mode-changing intervals resulting from the demodulation process of sampler 32. However, the wave form of curve Q, which is applied to speaker 45, is quite acceptable to a discerning listener who appreciates high fidelity sound and constitutes a considerable improvement over the signals produced by the systems described in the previous Van Jepmond and Druz applications.

The reason for including delay line 28 in the audio channel should now be apparent. By delaying the audio signal, the amplitude excursions of the undelayed decoding signal of curve F may be utilized to develop the pulses of curve N, each of which pulses individually embraces the transient distortion during an assigned one of the mode-changing intervals in the decoded audio signal of curve G. In this way, it is possible to anticipate each mode change and then delete or remove the portions of the decoded audio during the mode-changing intervals while at the same time substituting the removed portions with the output signal of curve H from the sampling apparatus.

By way of summary, amplifier and limiter 26 and detector 27 constitute a source of coded intelligence signal, namely, a source of coded audio signal, curve E. Decoding apparatus (audio decoder 30 and control mechanism or decoding signal source 48) is coupled to this source through delay line 28 for varying from time to time a characteristic (phase) of the coded intelligence signal between a plurality of different modes in accordance with a predetermined code schedule. A decoded intelligence signal (curve G) is therefore developed with the transitions during the spaced mode-changing intervals subject to introducing undesired transient distortion. Sampler 32, low-pass filter 36 and pulse generator 34 constitute sampling means coupled to the decoding apparatus (namely, to audio decoder 30) for effecting sampling of the decoded intelligence signal only at spaced time intervals different from the code-changing intervals to develop an output signal (curve H) that is a substantial simulation of the decoded intelligence signal of curve G except that the undesired transient distortion is removed. Electronic selector switch 38, differentiator and rectifier units 51 and 52, phase inverter 54, adder 53 and multivibrator 55 may be considered selecting means coupled to the decoding apparatus (through phase equalizer 40 to decoder 30 and also to control mechanism 48) and to the sampling means, namely, to low-pass filter 36, for selecting the output signal of curve H from the sampling means during the spaced mode-changing intervals and the decoded intelligence signal of curve G from the decoding apparatus during the intervening intervals.

While a particular embodiment of the invention has been shown and described, modifications may be made, and it is intended in the appended claims to cover all such modifications as may fall within the true spirit and scope of the invention.

We claim:

1. A secrecy communication receiver comprising: a source of coded intelligence signal; decoding apparatus coupled to said source for varying during spaced mode-changing intervals a characteristic of said coded intelligence signal between a plurality of different modes in accordance with a predetermined code schedule to develop a decoded intelligence signal having transitions during said spaced mode-changing intervals subject to introducing undesired distortion in the decoded intelligence signal; sampling means coupled to said decoding apparatus for effecting sampling of said decoded intelligence signal only at spaced time intervals different from said mode-changing intervals to develop an output signal that is a substantial simulation of said decoded intelligence signal except that the undesired distortion is removed; and selecting means coupled to said decoding apparatus and to said sampling means for selecting said output signal from said sampling means during said spaced mode-changing intervals and said decoded intelligence signal from said decoding apparatus during the intervening intervals.

2. A secrecy communication receiver comprising: a source of coded intelligence signal; decoding apparatus coupled to said source for varying during spaced mode-changing intervals a characteristic of said coded intelligence signal between a plurality of different modes in accordance with a predetermined code schedule to develop a decoded intelligence signal having transitions during said spaced mode-changing intervals subject to introducing undesired distortion in the decoded intelligence signal; sampling means coupled to said decoding apparatus for effecting sampling of said decoded intelligence signal only at spaced time intervals different from said mode-changing intervals to develop an output signal that is a substantial simulation of said decoded intelligence signal except that the undesired distortion is removed; means coupled to said decoding apparatus for developing a selecting signal; and selecting apparatus coupled to said selecting-signal-developing means, to said decoding apparatus and to said sampling means and responsive to said selecting signal for selecting said output signal from said sampling means during said spaced mode-changing intervals and said decoded intelligence signal from said decoding apparatus during the intervening intervals.

3. A secrecy communication receiver comprising: a source of coded intelligence signal; decoding apparatus coupled to said source and including a control mechanism for developing a decoding signal having characteristic variations representing a predetermined code schedule and a decoding device for utilizing said decoding signal to vary during spaced mode-changing intervals a characteristic of said coded intelligence signal between a plurality of different modes in accordance with said code schedule to develop a decoded intelligence signal having transitions during said mode-changing intervals subject to introducing undesired distortion in the decoded intelligence signal; sampling means coupled to said decoding apparatus for effecting sampling of said decoded intelligence signal only at spaced time intervals different from said mode-changing intervals to develop an output signal that is a substantial simulation of said decoded intelligence signal except that the undesired distortion is removed; means coupled to said control mechanism and responsive to said decoding signal for developing a selecting signal; and selecting apparatus coupled to said selecting-signal-developing means, to said decoding apparatus and to said sampling means and responsive to said selecting signal for selecting said output signal from said sampling means during said spaced mode-changing intervals and said decoded intelligence signal from said decoding apparatus during the intervening intervals.

4. A secrecy communication receiver comprising: a source of coded intelligence signal; decoding apparatus coupled to said source for varying during spaced mode-changing intervals a characteristic of said coded intelligence signal between a plurality of different modes in accordance with a predetermined code schedule to develop a decoded intelligence signal having transitions during said spaced mode-changing intervals subject to introducing undesired distortion in the decoded intelligence signal; sampling means coupled to said decoding apparatus for effecting sampling of said decoded intelligence signal only at spaced time intervals different from said mode-changing intervals to develop an output signal that is a substantial simulation of said decoded intelligence signal except that the undesired distortion is removed; means coupled to said decoding apparatus for developing a selecting signal consisting of a series of pulse components each of which corresponds to and embraces an assigned mode-changing interval; and selecting apparatus coupled to said selecting-signal-developing means, to said decoding apparatus and to said sampling means and responsive to said selecting signal for selecting said output signal from said sampling means during said spaced mode-changing intervals and said decoded intelligence signal from said decoding apparatus during the intervening intervals.

5. A secrecy communication receiver comprising: a source of coded audio signal; decoding apparatus coupled to said source and including a control mechanism for developing a decoding signal having characteristic variations representing a predetermined code schedule and a phase-inverting decoding device for utilizing said decoding signal to invert the phase of said coded audio signal at selected times determined by said code schedule to develop a decoded audio signal having transitions at said selected times subject to introducing undesired distortion in the decoded audio signal; sampling means coupled to said decoding device for effecting sampling of said decoded audio signal only at times different from said selected times to develop an output signal that is a substantial simulation of said decoded audio signal except that the undesired distortion is removed; means coupled to said control mechanism and responsive to said decoding signal for developing a selecting signal; and selecting apparatus coupled to said selecting-signal-developing means, to said decoding device and to said sampling means and responsive to said selecting signal for selecting said output signal from said sampling means at said selected times and said decoded audio signal from said decoding device during the intervals intervening said selected times.

6. An audio decoding arrangement for a subscription television receiver comprising: a source of coded audio signal having a number of phase inversions occurring in accordance with a predetermined code schedule; decoding apparatus coupled to said audio signal source for reinverting the phase of said coded audio signal at selected times determined by said predetermined code schedule to develop a decoded audio signal having transitions during the selected times subject to introducing undesired distortion in the decoded audio signal; sampling means coupled to said decoding apparatus for effecting sampling of said decoded audio signal only at spaced time intervals different from said selected times to develop an output signal that is a substantial simulation of said decoded audio signal except that the undesired distortion is removed; means coupled to said decoding apparatus for developing a selecting signal consisting of a series of pulses each of which corresponds to and embraces an assigned one of said selected times; and selecting apparatus coupled to said selecting-signal-developing means, to said decoding apparatus and to said sampling means and responsive to said selecting signal for selecting said output signal from said sampling means at said selected times and said decoded audio signal from said decoding apparatus during the intervals intervening said selected times.

7. A secrecy communication receiver comprising: a source of coded audio signal; decoding apparatus coupled to said source and including a control mechanism for developing a decoding signal having amplitude variations representing a predetermined code schedule and a phase-inverting decoding device for utilizing said decoding signal to vary during spaced mode-changing intervals the phase of said coded audio signal between a plurality of different modes in accordance with said code schedule to develop a decoded audio signal having transitions during said spaced mode-changing intervals subject to introducing undesired distortion in the decoded audio signal; sampling means coupled to said decoding apparatus for effecting sampling of said decoded audio signal only at spaced time intervals different from said mode-changing intervals to develop an output signal that is a substantial simulation of said decoded audio signal except that the undesired distortion is removed; a utilizing circuit; selecting apparatus coupling both said decoding apparatus and said sampling means to said utilizing circuit; means coupled to said control mechanism and responsive to the amplitude variations of said decoding signal for developing a selecting signal consisting of a series of pulses each of which corresponds to and embraces an assigned mode-changing interval; and means coupling said selecting-signal-developing means to said selecting apparatus to render said selecting apparatus effective during said spaced mode-changing intervals for translating said output signal from said sampling means to said utilizing circuit and effective during the intervening intervals for translating said decoded audio signal from said decoding apparatus to said utilizing circuit.

8. A secrecy communication receiver comprising: a source of coded intelligence signal; decoding apparatus coupled to said source for varying during spaced mode-changing intervals a characteristic of said coded intelligence signal between a plurality of different modes in accordance with a predetermined code schedule to develop a decoded intelligence signal having transitions during said spaced mode-changing intervals subject to introducing undesired distortion in the decoded intelligence signal; sampling means coupled to said decoding apparatus for effecting sampling of said decoded intelligence signal only at spaced time intervals different from said mode-changing intervals to develop an output signal that is a substantial simulation of said decoded intelligence signal except that the undesired distortion is removed, said sampling means introducing a phase variation between said output signal and said decoded intelligence signal; a phase equalizer coupled to said decoding apparatus for varying the phase of said decoded intelligence signal to match the phase change introduced by said sampling means; means coupled to said decoding apparatus for developing a selecting signal; and selecting apparatus coupled to said selecting-signal-developing means, to said phase equalizer and to said sampling means and responsive to said selecting signal for selecting said output signal from said sampling means during said spaced mode-changing intervals and said decoded intelligence signal from said phase equalizer during the intervening intervals.

9. A secrecy communication receiver comprising: a source of coded audio signal containing desired audio components having frequencies falling in the audible range of the frequency spectrum and subject to distortion represented by undesired relatively high-frequency extraneous noise components lying outside the audible range; decoding apparatus coupled to said source for varying during spaced mode-changing intervals a characteristic of said coded audio signal between a plurality of different modes in accordance with a predetermined code schedule to develop a decoded audio signal, also containing said undesired high-frequency noise components, having transitions during said spaced mode-changing intervals subject to introducing undesired transient distortion in the decoded intelligence signal; sampling means coupled to said decoding apparatus for effecting sampling of said decoded audio signal only at spaced time intervals different from said mode-changing intervals to develop an output signal that is a substantial simulation of said decoded audio signal except that the undesired transient distortion is removed and said high-frequency noise components are demodulated into the audible range of the frequency spectrum to form relatively low-frequency noise components; means coupled to said decoding apparatus for developing a selecting signal; selecting apparatus coupled to said selecting-signal-developing means, to said decoding apparatus and to said sampling means and responsive to said selecting signal for selecting said output signal from said sampling means during said spaced mode-changing intervals and said decoded intelligence signal from said decoding apparatus during the intervening intervals to produce a final signal which is devoid of said transient distortion during said mode-changing intervals but contains said low-frequency noise components during such mode-changing intervals and contains said high-frequency noise components during said intervening intervals; and wave-shaping means coupled to said selecting apparatus for removing substantially all of said high-frequency noise components from said final signal during said intervening intervals, effectively to smooth out said final signal.

10. A frequency-modulation secrecy communication receiver comprising: a source of coded audio signal containing audio components falling in the audible range of the frequency spectrum and subject to distortion represented by undesired relatively high-frequency noise components lying outside the audible range; decoding apparatus coupled to said source for varying during spaced mode-changing intervals a characteristic of said coded audio signal between a plurality of different modes in accordance with a predetermined code schedule to develop a decoded audio signal, also containing said undesired high-frequency noise components, having transitions during said spaced mode-changing intervals subject to introducing undesired transient distortion in the decoded audio signal; sampling means coupled to said decoding apparatus for effecting sampling of said decoded audio signal only at spaced time intervals different from said mode-changing intervals to develop an output signal that is a substantial simulation of said decoded audio signal except that the undesired transient distortion is removed and said high-frequency noise components are demodulated into the audible range of the frequency spectrum to form relatively low-frequency noise components; means coupled to said decoding apparatus for developing a selecting signal; selecting apparatus coupled to said selecting-signal-developing means, to said decoding apparatus and to said sampling means and responsive to said selecting signal for selecting said output signal from said sampling means during said spaced mode-changing intervals and said decoded audio signal from said decoding apparatus during the intervening intervals to produce a final signal which is devoid of said transient distortion during said mode-changing intervals but contains said low-frequency noise components during such mode-changing intervals and contains said high-frequency noise component during said intervening intervals; and a de-emphasis network coupled to said selecting apparatus for removing substantially all of said high-frequency noise components from said final signal during said intervening intervals, effectively to smooth out said final signal.

11. A secrecy communication receiver comprising: a signal source for providing a coded intelligence signal, which has been previously subjected to a coding function and converted from an uncoded intelligence signal, having desired components occupying a predetermined portion of the frequency spectrum and subject to the introduction of extraneous undesired noise components exhibiting frequencies above said predetermined portion; decoding apparatus coupled to said source for varying during spaced mode-changing intervals a characteristic of said coded intelligence signal between a plurality of different modes in accordance with a predetermined code schedule to develop a decoded intelligence signal, corresponding to said uncoded intelligence signal but containing said extraneous undesired noise components, having transitions during said spaced mode-changing intervals subject to introducing undesired transient distortion in the decoded intelligence signal; sampling means coupled to said decoding apparatus for effecting sampling of said decoded intelligence signal only at spaced time intervals different from said mode-changing intervals to develop an output signal that is a substantial simulation of said decoded intelligence signal except that the undesired transient distortion is removed and said undesired noise components, because of the demodulation effect of said sampling means, fall within said predetermined portion of the frequency spectrum; means coupled to said decoding apparatus for developing a selecting signal; selecting apparatus coupled to said selecting-signal-developing means, to said decoding apparatus and to said sampling means and responsive to said selecting signal for selecting said output signal from said sampling means during said spaced mode-changing intervals and said decoded intelligence signal from said decoding apparatus during the intervening intervals to produce a final signal which is devoid of said undesired transient distortion during said mode-changing intervals, although it contains the extraneous noise components demodulated down into said predetermined portion of said frequency spectrum, and which contains during the intervening intervals the unaltered noise components lying above said predetermined portion; and frequency-selective means coupled to said selecting apparatus for removing substantially all of said noise components falling above said predetermined portion of the frequency spectrum to shape the waveform of the final signal to more closely conform said final signal to said uncoded intelligence signal.

References Cited in the file of this patent

UNITED STATES PATENTS

| | | |
|---|---|---|
| 2,479,338 | Gabrilovitch | Aug. 16, 1949 |
| 2,579,302 | Carbery | Dec. 18, 1951 |
| 2,669,608 | Goodall | Feb. 16, 1954 |
| 2,686,869 | Bedford | Aug. 17, 1954 |
| 2,769,861 | Black | Nov. 6, 1956 |

OTHER REFERENCES

Appendix before the Federal Communications Commission in the matter of: Amendment of Part 3 of the Commission's Rules and Regulations to Provide for Subscription Television Service (Appendix to Comments of Zenith Radio Corporation and Teco, Inc.) (received at the Patent Office June 21, 1955), pages 6–15.